UNITED STATES PATENT OFFICE.

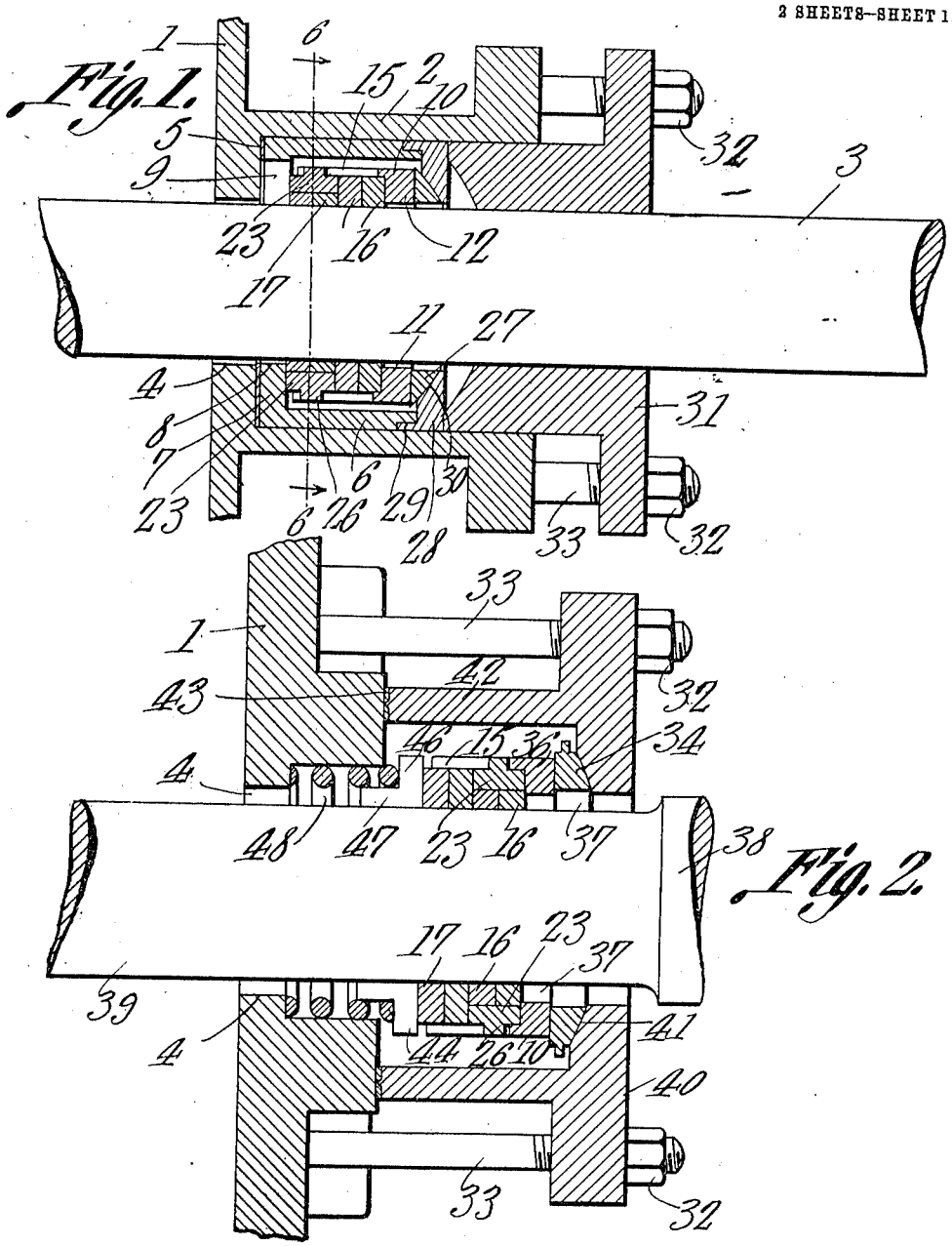

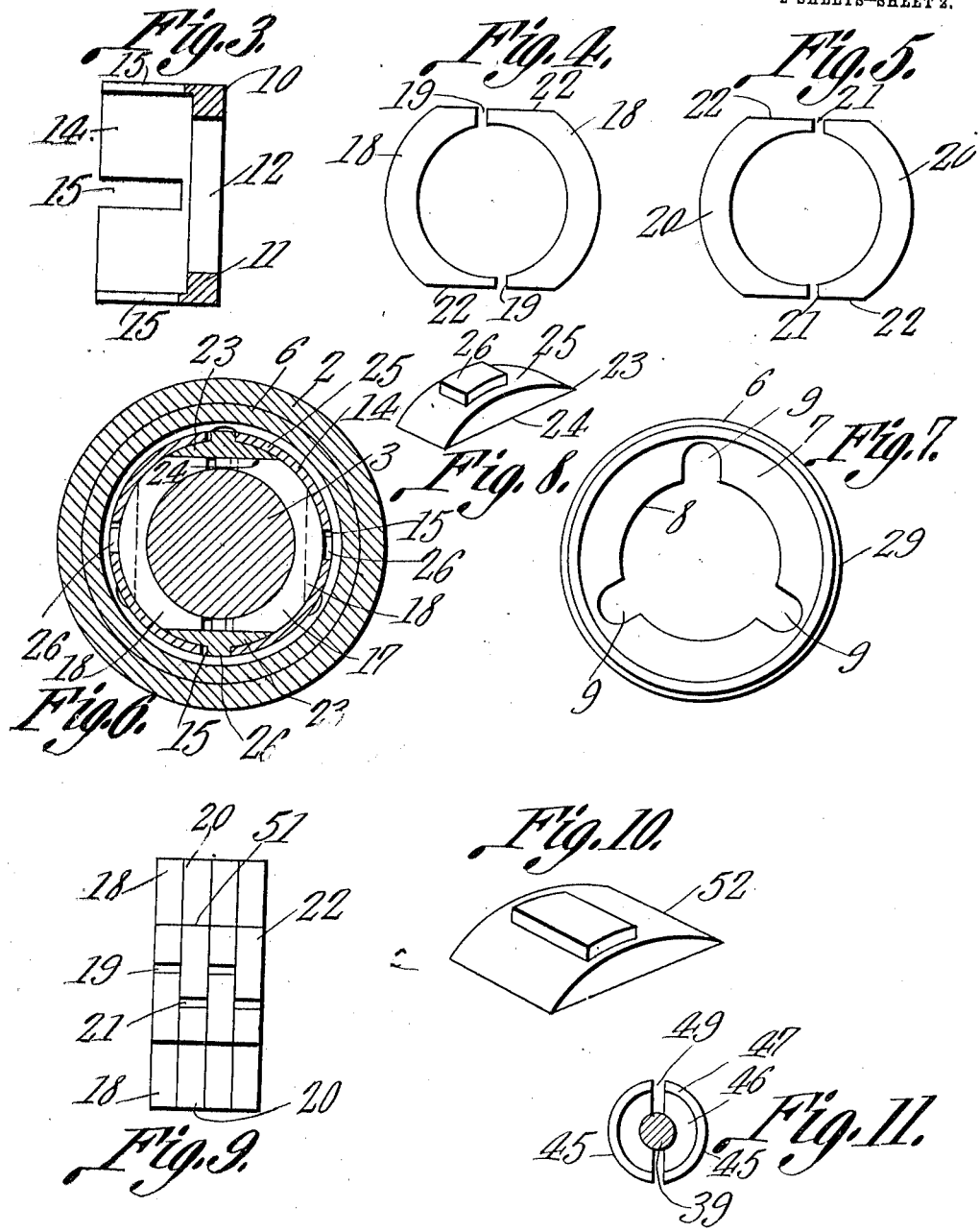

THOMAS SMITH, OF SAN LUIS POTOSI, MEXICO.

ROD-PACKING.

974,197.

Specification of Letters Patent. Patented Nov. 1, 1910.

Application filed August 17, 1910. Serial No. 577,545.

*To all whom it may concern:*

Be it known that I, THOMAS SMITH, a citizen of the United States, residing at San Luis Potosi, State of San Luis Potosi, Republic of Mexico, have invented a new and useful Rod-Packing, of which the following is a specification.

It is the object of this invention to provide a packing for a piston rod, so constructed that when fluid pressure is upon the piston between the piston and the cylinder head in which the piston rod works, this fluid pressure may be effective to set up the packing about the piston rod, the packing being released from the rod when the fluid pressure is released upon the exhaust stroke.

Another object of the invention is to provide a piston rod packing consisting of a plurality of segmental rings of novel and improved form, and to provide a novel means for holding the segmental rings against rotation upon the rod, whereby the space between the abutting ends of the constituent members of the rings, may be maintained out of alinement, in successive rings.

Another object of the invention is to provide novel means for assembling the packing, for holding the packing in place within the packing glands, and for adjusting the pressure upon the packing longitudinally of the piston rod which works to and fro in the packing.

With the above and other objects in view, the invention consists in the novel construction and arrangement of parts hereinafter described, delineated in the accompanying drawings, and specifically claimed, it being understood that, within the scope of what is claimed, divers changes may be made, without departing from the spirit of the invention or sacrificing any of the advantages thereof.

In the accompanying drawings,—Figure 1 is a longitudinal section of a portion of a cylinder, showing the piston rod in elevation, surrounded by the packing of my invention; Fig. 2 is a longitudinal section, similar to Fig. 1, but showing a modified form of packing; Fig. 3 is a longitudinal section of the cup in which the piston rod packing is mounted; Fig. 4 is an elevation of one of the segmental packing rings; Fig. 5 is an elevation of another form of segmental ring; Fig. 6 is a vertical transverse section upon the line 6—6 of Fig. 1; Fig. 7 is an end elevation of the housing in which the cup is mounted, in one form of the invention; Fig. 8 is a detail perspective of one of the bridges; Fig. 9 is a side elevation, showing a modified arrangement of packing rings; Fig. 10 is a perspective of a bridge piece adapted to be employed in the packing rings, when the same are assembled as shown in Fig. 9; and Fig. 11 is an end elevation of the retaining ring shown in Fig. 2, the same being mounted upon the piston rod.

In the drawings, and referring particularly to Fig. 1, a portion of the cylinder head is shown, and denoted by the numeral 1. The cylinder head 1 is provided with a stuffing box 2, the piston rod, denoted by the numeral 3, working in the stuffing box 2 in the usual manner.

The opening 4 in the cylinder head 1, in which the piston rod 3 operates, is slightly larger in diameter than the diameter of the piston rod 3. Disposed within the stuffing box 2, and in abutment with the cylinder head 1, is a packing 5, preferably fashioned from soft metal. Against this packing 5, a cylindrical housing 6 abuts, the housing 6, being, as shown in Fig. 7, provided with an end wall 7, which is in abutment with the packing 5. In the end wall 7 of the housing 6 there is an opening 8, for the reception of the piston rod 3. This opening 8 is provided with a plurality of radial enlargements 9, seen most clearly in Fig. 12 of the drawings.

The invention further includes a cup 10, shown in detail in Fig. 3. This cup 10 is provided with an end wall 11, in which there is an opening 12, for the reception of the piston rod 3. In the side walls 14 of the cup 10, there are a plurality of slots 15, the slots 15 being preferably four in number, and located 90° remote from each other, although this detail, obviously, may be departed from, without sacrificing the spirit of the invention. The cup 10 is adapted to be disposed within the housing 6, as shown most clearly in Fig. 1, the open end of the cup 10 being disposed toward the end wall 7 of the housing 6.

The cup 10 is adapted to receive a plurality of segmental rings, denoted in Fig. 1, by the numerals 16 and 17. These segmental rings are shown in Figs. 4 and 5 of the drawings. In Fig. 4, the rings consist of two parts 18, the ends of which are spaced apart, as shown at 19 in Fig. 4 and being disposed out of alinement with each other. However, the packing rings may be fashioned as shown in Fig. 5, the rings comprising parts 20, spaced apart as shown at 21, when the rings are disposed about the piston rod, the openings 21 between the adjacent ends of the sections of the ring being disposed opposite to each other. Whether the rings are fashioned as shown in Fig. 4, or as shown in Fig. 5, the same are flat, at diametrically opposite points, to form seats 22. These flattened teeth 22 are adapted to receive bridges 23, shown in Fig. 8. The lower faces of the bridges 23 are flat, as shown at 24, the upper faces of the bridges being curved, as denoted by the numeral 25, to conform approximately to the curvature of the inner face of the cup 10. The bridges 23 are provided with lugs 26, which upstand from their curved faces 25.

In mounting the packing rings in the cup 10, two bridges 23 are first mounted in the cup, the rings denoted by the numeral 16 being then inserted into the cup. The bridges 23 which are thus mounted in place, will serve to retain the rings 16 against movement transversely of the piston rod 3. Another pair of bridges 23 are then mounted in place in the cup 10, the lugs 26 of this last named pair of bridges being disposed in slots 15 of the cup 10 which are 90° remote from those slots in which the first named bridges were inserted. The rings 17 are then mounted in place within the cup, and engaged by this last named pair of bridges. From the foregoing, it will be seen that the openings between the adjacent ends of the sections of the rings 16 will be held out of alinement with the openings between the adjacent ends of the meeting sections of the rings 17. By this construction, there is no continuous opening through the segmental rings 16 and 17, longitudinally of the piston rod 3, the rings 16 and 17 being disposed with broken joints, the engagement between the lugs 26 and the cup 10, serving to maintain the rings 16 and 17 with the openings through the said rings out of alinement. A joint ring 27 is then mounted upon the piston rod 3, and disposed in abutment with the outer end face of the cup 10, as clearly seen in Fig. 1. The housing 6 is provided with a closure cap 28, having an opening for the reception of the rod 3, and halved into the housing 6, as denoted by the numeral 29. The abutting faces of the joint ring 27 and closure cap 28 are curved, as denoted by the numeral 30. By this construction, the joint ring 27 and the closure cap 28 will be permitted to have a slight relative movement, without opening the joint between them.

The piston rod 3 is inclosed by a gland 31. This gland 31 presses against the closure cap 28, the gland being held in place by any suitable means. For instance, if desired, the gland 31 may be actuated by nuts 32, mounted upon bolts 33, secured in any desired manner to the stuffing box 2.

The operation of the device as set forth in Fig. 1 is as follows: When the nuts 32 are tightened, the gland 31 will be thrust against the closure cap 28, the closure cap 28 pressing against the housing 6, and forcing the housing 6 against the packing 5, to make a steam tight joint. Moreover, the closure cap 28 will bear against the joint ring 27, the joint ring 27 bearing against the cup 10, the cup 10 compacting the packing rings 16 and 17 against the end wall 7 of the housing 6, it being noted, as clearly discernible in Fig. 1, that the combined widths of the rings 16 and 17 is greater than the length of the side walls 14 of the cup 10, the cup 10 being thus prevented from coming into terminal abutment with the end wall 7 of the housing 6. The steam which is within the cylinder, will pass through the opening 4 in the cylinder head 1, between the cylinder head and the piston rod 3. The steam will then pass through the radial enlargements 9 of the opening 8 in the end wall 7 of the housing. The internal diameter of the housing 6 is somewhat greater than the external diameter of the cup 10, and by this construction, a fluid space is provided between the housing 6 and the cup 10. The slots 15 will, as shown in Fig. 1, permit the steam to pass from the fluid pressure space between the housing 6 and the cup 10, upon the packing rings, and thus, the packing rings will be set up tight against the rod 3. Obviously, the bridges 23 are under fluid pressure, the bridges being, of course, forced tightly against the packing rings upon which they rest. By referring to Fig. 6 of the drawings, it will be seen that the lugs 26 do not entirely fill the slots 15. Thus, the slots 15 serve as steam ports, permitting fluid pressure to be brought upon both bridges 23 and the packing rings.

From the foregoing it will be seen that the rings 16 and 17, being actuated by the fluid pressure within the cylinder, will be set up closely about the piston rod 3. As soon, however, as the fluid pressure within the piston is released, the rings 16 and 17 will be released from the piston rod 3. Thus, on the exhaust stroke, the friction between the packing rings 16 and 17 and the piston rod 3 will be materially reduced. The friction between the piston rod 3 and the packing rings 16 and 17 being thus diminished, the wear upon these contacting parts is decreased accordingly.

The packing 5 secures a steam tight joint between the parts with which it is engaged. The housing 6 and the closure cap 28 are ground to a steam tight joint at 29. There is a steam tight joint between the closure cap 28 and the joint ring 27. And thus the fluid pressure in the space between the housing 6 and the cup 10 will be maintained intact. It will be seen that by reason of the fact that the lugs 26 of the bridges 23 whereby the rings 17 are held in place, are mounted in different slots 15 from the lugs of the bridges whereby the packing rings 16 are held in place, there will be no continuous opening through the segmental packing rings from one end of the packing to the other, and thus, although the packing rings may contract freely about the piston rod 3, under the fluid pressure existing within the cylinder, there will be no leakage between the piston rod 3 and the parts in which it reciprocates.

A modified form of the invention is shown in Fig. 2. In this form of the invention, the joint ring 34 and the cup 36 are bored out, as shown at 37, to receive the enlarged portion 38 of the piston rod 39, the form of the invention shown in Fig. 2 being adapted to be employed upon engines of the Atlantic type. In this form of the invention, the housing 6 and the closure cap 28 are omitted, the joint ring 34 bearing directly against the gland 40, the abutting faces of the gland 40 and the joint ring 34 being curved, as shown at 41, to provide for a slight movement between the parts, without opening the joint between them. The gland 40 carries a flange 42, and between this flange 42 and the cylinder head 1, a packing 43 is introduced, to provide for a steam tight joint. The packing rings 17 abut against a segmental retaining ring 44, consisting of parts 45. Each of these parts consist, in its turn, of an upstanding flange 46, and a flange 47, inclosing the piston rod 39. A helical compression spring 48 abuts against the cylinder head 1, at one end, and against the flange 46 at the other end. It will be seen that this compression spring 48, coöperating with the nuts 32, serves to retain the packing rings 16 and 17 under proper compression. The parts 45 of the ring 44 are spaced apart (49), and thus the steam from the cylinder may enter the fluid pressure space located between the flange 42 and the cup 10 in which the rings 16 and 17 are located, the rings, together with the bridges whereby they are held in place, being under fluid pressure, as hereinbefore described in connection with Fig. 1.

Referring to Fig. 9, and comparing Fig. 9 with Figs. 4 and 5, it will be seen that the rings shown in Figs. 4 and 5, may be alternated upon the piston rod, their seats being in alinement, the openings 19 and 21, being, however, disposed out of alinement. When the seats 22 are thus alined, as denoted by the numeral 51, the rings may be engaged, upon each side, and at diametrically opposite points, by bridges 52, shown in Fig. 10. This bridge 52 is of sufficient length to extend across four rings, while the bridge employed in Figs. 1 and 2 is sufficient length to extend across but two rings only. The construction shown in Figs. 9 and 10 may be employed where a simple packing is desired, but two of the bridges 52, oppositely disposed, being employed to hold the rings together, with the openings between their segmental parts out of alinement, as shown in Fig. 9.

Having thus described the invention what is claimed is:—

1. In a device of the class described, a tubular member adapted to surround a piston rod; segmental rod inclosing rings in the tubular member; bridges interengaged with the rings and the tubular member to hold the rings against rotation upon the rod; the rings and the bridges being under the fluid pressure of the space in which the piston rod operates.

2. In a device of the class described, a tubular member having slots in its side walls and adapted to inclose a piston rod; segmental rod-inclosing rings in the tubular member; bridges interengaging with the rings and having lugs to register in the slots; and an inclosing structure for the tubular member defining a fluid pressure space communicating with the fluid pressure space with which the piston rod operates, the slots constituting ports for the admission of fluid pressure upon the rings.

3. In a device of the class described, segmental rings adapted to inclose a piston rod; bridges interengaging with the rings; means engaging the bridges to limit the movement of the bridges and the rings transversely of the rod; and an inclosing structure for the rings and the bridges defining a fluid pressure space communicating with the fluid pressure space in which the piston rod operates.

4. In a device of the class described, a tubular member having slots in its side walls and adapted to inclose a piston rod; segmental rod-inclosing rings in the tubular member and provided with flat peripheral seats; bridges resting upon the seats and conforming approximately to the bore of the tubular member, the bridge being provided with lugs adapted to register loosely in the slots of the tubular member; and an inclosing structure for the tubular member, defining a fluid pressure space which communicates with the fluid pressure space in which the piston rod operates, the slots in the tubular member constituting ports whereby the rings and the bridges may be exposed to the fluid pressure.

In testimony that I claim the foregoing as my own, I have hereto affixed my signature in the presence of two witnesses.

THOMAS SMITH.

Witnesses:
THOMAS DICKINSON,
E. D. LEEPER.